United States Patent [19]

Dick et al.

[11] 4,041,809
[45] Aug. 16, 1977

[54] MULTIPLE-TRANSMISSION-RATIO TRANSMISSION ARRANGEMENT WITH GEAR-SHIFT OVERLAP ACTION OF AUTOMATICALLY VARIED DURATION

[75] Inventors: Heinrich Dick, Nattheim; Erhard Kobinger, Giengen, Brenz, both of Germany

[73] Assignee: Voith Getriebe KG, Heidenheim, Brenz, Germany

[21] Appl. No.: 621,634

[22] Filed: Oct. 10, 1975

[30] Foreign Application Priority Data

Oct. 16, 1974 Germany .................. 2449196

[51] Int. Cl.² .................. B60K 41/18; F16H 3/74
[52] U.S. Cl. .................. 74/866; 74/752 D
[58] Field of Search .................. 74/866, 752 A, 752 D

[56] References Cited

U.S. PATENT DOCUMENTS

| | | | |
|---|---|---|---|
| 3,640,156 | 2/1972 | Mori et al. | 74/866 |
| 3,732,755 | 5/1973 | Beig et al. | 74/866 |
| 3,823,621 | 7/1974 | Kubo et al. | 74/752 A |
| 3,898,893 | 8/1975 | Hashimoto et al. | 74/866 X |

Primary Examiner—Samuel Scott
Assistant Examiner—Lance W. Chandler
Attorney, Agent, or Firm—Michael J. Striker

[57] ABSTRACT

The transmission arrangement includes first and second hydraulically activatable units. When the first and second units are activated and unactivated, respectively, the arrangement exhibits a first transmission ratio. When the first and second units are unactivated and activated, respectively, the arrangement exhibits a second transmission ratio. Electrically controllable first and second valves each connect an associated unit to a source of hydraulic fluid. A transmission-ratio changeover is effected by causing the valves to undergo opposite changes of energization state. Each valve has its own time-delay stage. Upon receipt of a signal commanding a transmission-ratio changeover, each time-delay stage delays the initiation of the change of energization state of the associated valve by a respective time-delay interval. During a changeover from the first to the second transmission ratio, the initiation of the change of energization state of the first valve can be made to either lead or lag that of the second valve, simply by making the first time-delay interval either shorter or longer than the second time-delay interval.

6 Claims, 4 Drawing Figures

MULTIPLE-TRANSMISION-RATIO TRANSMISSION ARRANGEMENT WITH GEAR-SHIFT OVERLAP ACTION OF AUTOMATICALLY VARIED DURATION

BACKGROUND OF THE INVENTION

The invention relates to a multiple-transmission-ratio transmission arrangement such as disclosed in commonly assigned, copending application Ser. No. 463,379, of Heinrich Dick, filed Apr. 23, 1974, the entire disclosure of which is incorporated herein by reference. This transmission arrangement includes an electronic control arrangement which automatically triggers a changeover from one transmission ratio to another. With each changeover of transmission ratio, a frictional gear-changing unit (such as a brake or clutch) which was previously activated is deactivated whereas another frictional gear-changing unit which was previously deactivated is now activated. Furthermore, the electronic control arrangement determines the duration of the deliberately introduced, transitional gear-shift overlap action occurring during the changeover from one transmission ratio to another. The gear-shift overlap action can be positive or negative. A positive gear-shift overlap involves transitional overlap in the activation of the two gear-changing units (brakes or clutches) involved in a transmission ratio changeover, whereas a negative gear-shift overlap involves transitional overlap in the deactivation of the two gearchanging units (brakes or clutches) involved in a transmission ratio changeover. For example, if a particular transmission-ratio changeover involves the hydraulic activation of a brake and the hydraulic deactivation of a clutch, a positive gear-shift overlap would involve deactivating the clutch only after the brake is activated, whereas a negative gear-shift overlap would involve activating the brake only after the clutch has been deactivated. With the type of electronic control arrangement in question, the duration of the gear-shift overlap action, whether positive or negative, can be preset very exactly, and if necessary changed after construction or installation.

It is desirable to be able to set the durations of up-shifting and down-shifting gear-shift overlaps to different values. In application Ser. No. 463,379, to achieve this, each frictional gear-changing unit (hydraulic brake or clutch) is provided with its own respective solenoid through which hydraulic fluid is supplied, and each such solenoid valve is provided with an electronic switch device of its own. Furthermore, the two solenoid valves associated with the changeover from one to the next transmission ratio (e.g., the changeover from second gear to third gear, and back from third gear to second gear) are provided with a single electronic timing stage for introducing a time delay for the gear-shift overlap action. This single timing stage is associated with one of the two solenoid valves; i.e., it delays the deenergization of the associated solenoid valve when the energization of the other solenoid valve is being initiated, and it delays the energization of the associates solenoid valve when the deenergization of the other solenoid valve is being initiated. In this way, it is possible to achieve a positive gear-shift overlap action for every up-shifting transmission-ratio changeover and a negative gear-shift overlap action for every down-shifting transmission ratio changeover.

SUMMARY OF THE INVENTION

It is a general object of the invention to so modify the electronic control arrangement of the type in question as to make possible the selective establishment for any particular transmission-ratio changeover (preferably for the down-shifting changeovers) either a negative or a positive gear-shift overlap action, with the selection of negative or positive gear-shift overlap action being made automatically in dependence upon an operating parameter of the transmission or upon an operating parameter of the engine or motor driving the transmission, for example the loading of the engine.

This object, and others which will become understandable from the description, below, of preferred embodiments, can be met, according to one advantageous inventive concept, by providing each of the two solenoid valves associated with a particular transmission-ratio changeover with a separate timing stage of its own, with the operation of at least one of such pair of timing stages being dependent upon an operating parameter, such as the loading of the engine driving the transmission arrangement.

The provision of these two timing stages makes possible the following: If the electronic control arrangement commands a changeover from one to the next transmission ratio, both the signal which triggers the deenergization of the hitherto deenergized solenoid valve can be modified by the introduction of respective time delays. The two time delays will be of different duration, so as to establish a gear-shift overlap action. Moreover, the timing stage which works in dependence upon an operating parameter will include for example a resistance whose value changes in dependence upon such operating parameter, so that the time delay associated with this stage will automatically increase and decrease, relative to the time delay associated with the other time delay stage, in dependence upon the monitored parameter. This provides a particularly elegant way of achieving the object stated above. Specifically, if the deenergization of the hitherto energized solenoid valve is delayed more than is the energization of the hitherto deenergized solenoid valve, then a positive gear-shift overlap action, for example, will be achieved, and in the opposite situation a negative gear-shift overlap action will be achieved.

This method, by which the sign (positive or negative) of the gear-shift overlap action is changed automatically in dependence upon engine loading or another operating parameter, is utilized to particular advantage in downshifting by providing the timing stage associated with the higher gear with the variable-time-delay feature. When down-shifting at low engine loading (for example, down shifting when travelling downhill), it is frequently appropriate to establish a relatively long negative gearshift overlap action, so that the engine can rapidly speed up to the requisite higher speed. When downshifting at high engine loading (for example, down-shifting when travelling uphill), there should instead be established a very short-lasting negative gear-shift overlap action or even a positive gear-shift overlap action, in order to reliably avoid engine racing.

When the gear shift overlap times are controlled in this way, it is possible to establish at very low cost an optimal relationship between the gear-shift overlap times and the different values of the monitored operating parameter or parameters. However, with the control expedient in question there exists in principle the danger that, as a result of mechanical jamming of a control slide valve member associated with one of the solenoid valves, two frictional gear-changing units (hydraulic brakes or clutches) associated with different transmission ratios might both be kept activated for longer periods of time than involved in a normal transmission-ratio changeover. In such event, the frictional gear-changing units would quickly become overstressed and even destroyed.

In consideration of this possibility, the invention contemplates providing a way of reliably preventing two frictional gear-changing units (brakes or clutches) associated with two different transmission ratios from remaining both activated for a time period substantially longer than the range of time periods to which the adjustable time delay stages of the control arrangement can be automatically set. This can be accomplished by providing each of the two solenoid valves associated with the two transmission ratios of a particular changeover with its own respective monitoring arrangement. Such monitoring arrangement is operative, only during the flow of pressure fluid to the associated frictional gear-changing unit (brake or clutch) for generating a monitor signal. Furthermore, the two solenoid valves associated with two successive transmission ratios are provided with a safeguard switching arrangement. The latter receives the monitor signals from the associated monitoring arrangements, and if the monitoring signals persist concurrently for longer than a predetermined time interval, the safeguard switching arrangement generates a safeguard signal. The safeguard signal either interrupts the fluid pressure in the hydraulic system or else triggers a corresponding opposite transmission-ratio changeover.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
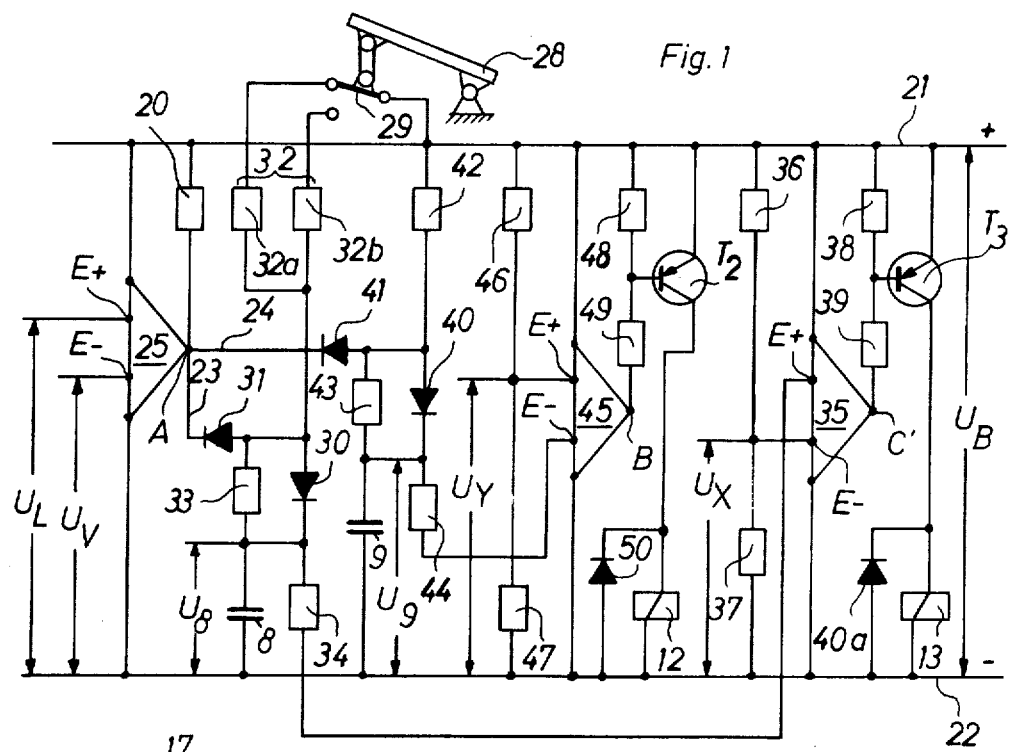
FIG. 1 depicts the circuitry for an electronic control arrangement operative for controlling two solenoid valves associated with up-shift and down-shift changeovers from one to the other of two successive transmission ratios.

In FIG. 1, connected across the battery voltage $U_B$ are two voltage supply lines 21 and 22. Line 21 is connected to the positive and line 22 to the negative battery terminal. A voltage $U_L$ dependent upon the loading of the engine driving the transmission arrangement is applied to the E+ input of a voltage comparator amplifier stage 25, whereas there is applied to the E− input of stage 25 a voltage $U_V$ proportional to the output rotary speed of the transmission arrangement. So long as $U_L$ is greater than $U_V$, output A of stage 25, via resistor 20, will be maintained at positive potential (line 21); in contrast, so long as $U_L$ is equal to or less than $U_V$, output A of stage 25 will be at negative potential (line 22). The first case (output A of stage 25 at positive potential) constitutes a command to effect a transmission-ratio changeover into second gear. In this first case, there are transmitted from output A of stage 25 a first signal via line 24 and a second signal via line 23. The first signal triggers the energization of a solenoid valve 12, and the second signal triggers the deenergization of a further solenoid valve 13. The second case (output A of stage 25 at negative potential) constitutes a command to effect a transmission-ratio changeover into third gear. In this second case, there are transmitted from output A of stage 25 a first signal via line 23 and a second signal via line 24. The first signal triggers the energization of solenoid valve 13 whereas the second signal triggers the deenergization of solenoid valve 12.

For transmitting and processing the aforementioned signals the following is provided: Line 24 leads on the one hand to a first electronic timing stage. The latter includes a capacitor 9, which is charged via a resistor 42 and diode 40 when the output A of stage 25 is at positive potential, and which is discharged via a resistor 43 and a diode 41 when output A of stage 25 is at negative potential. Line 23 leads from output A of stage 25 to a similar second electronic timing stage 8, 30–33. This second timing stage differs from the first exclusively in the provision of two charging resistors 32a, 32b which are alternatively connectable to positive line 21. The two charging resistors 32a, 32b have different resistances and together constitute a variable resistor 32.

The connection of the charging resistors 32a and 32b to positive line 21 is performed by a changeover switch 29 activated by the gas pedal 28 of the vehicle. The arrangement operates in such a manner that when gas pedal 28 is depressed from only a little up to about half-way (low loading of the engine) the charging resistor 32a is connected to positive line 21, whereas when pedal 28 is depressed from about half-way up to fully (high loading of the engine) the charging resistor 32b is connected to positive line 21. It will be apparent that instead of this arrangement of discrete, alternatively connected charging resistors use could be made of a potentiometer whose wiper is mechanically coupled to the gas pedal 28.

The voltage $U_9$ across capacitor 9 is applied via a resistor 44 to input E− of another voltage comparator amplifier stage 45. Input E+ of stage 45 is connected to the tap of a voltage divider 46, 47 which is connected between the positive and negative lines 21, 22. The voltage-divider tap voltage $U_y$ will always be less than the voltage $U_9$ across capacitor 9 when the latter is fully charged. A voltage divider 48, 49, connected between output B of stage 45 and positive line 21, has its tap connected to the base of a switching transistor $T_2$. Connected in series with the collector-emitter path of transistor $T_2$ across the lines 21, 22 is the solenoid 12, and the latter is shunted by a protective diode 50. So long as output A of stage 25 is at positive potential, and accordingly the capacitor 9 charged, transistor $T_2$ will be conductive and accordingly solenoid 12 (associated with second gear) energized.

The voltage $U_8$ across the capacitor 8 is applied via a resistor 34 to input E+ of a further voltage comparator amplifier stage 35. Here, likewise, input E− of stage 35 is connected to the tap of a voltage divider 36, 37 which is connected across the positive and negative lines 21, 22. The tap voltage $U_r$ of this voltage divider 36, 37 is always smaller than the voltage $U_8$ across capacitor 8 when the latter is fully charged. As with stage 45, output C of stage 35 is connected to positive line 21 via a voltage divider 38, 39 whose tap is connected to the base of a switching transistor $T_3$. The latter has its collector-emitter path connected in series with solenoid 13 across the battery voltage lines 21, 22, and a protective diode 40a shunts solenoid 13. So long as output A of stage 25 is at positive potential and accordingly capacitors 8 and 9 charged, transistor $T_2$ will be conductive and $T_3$ non-conductive, so that solenoid 12 will be energized and solenoid 13 unenergized.

If now the output rotary speed of the transmission arrangement increases, voltage $U_V$ will become greater than voltage $U_L$, and the output A of voltage comparator amplifier stage 25 will go negative. As a result, capacitors 8 and 9 will both discharge, the one via resistor 33 and diode 31, the other via resistor 43 and diode 41. As soon as voltage $U_8$ falls below voltage $U_r$, transistor $T_3$ becomes conductive and solenoid 13 (associated with third gear) becomes energized; furthermore, as soon as voltage $U_9$ falls below voltage $U_y$, transistor $T_2$ becomes non-conductive, so that valve solenoid 12 is deenergized and accordingly the associated hydraulic gearchanging unit for second gear deactivated.

Figure 4:
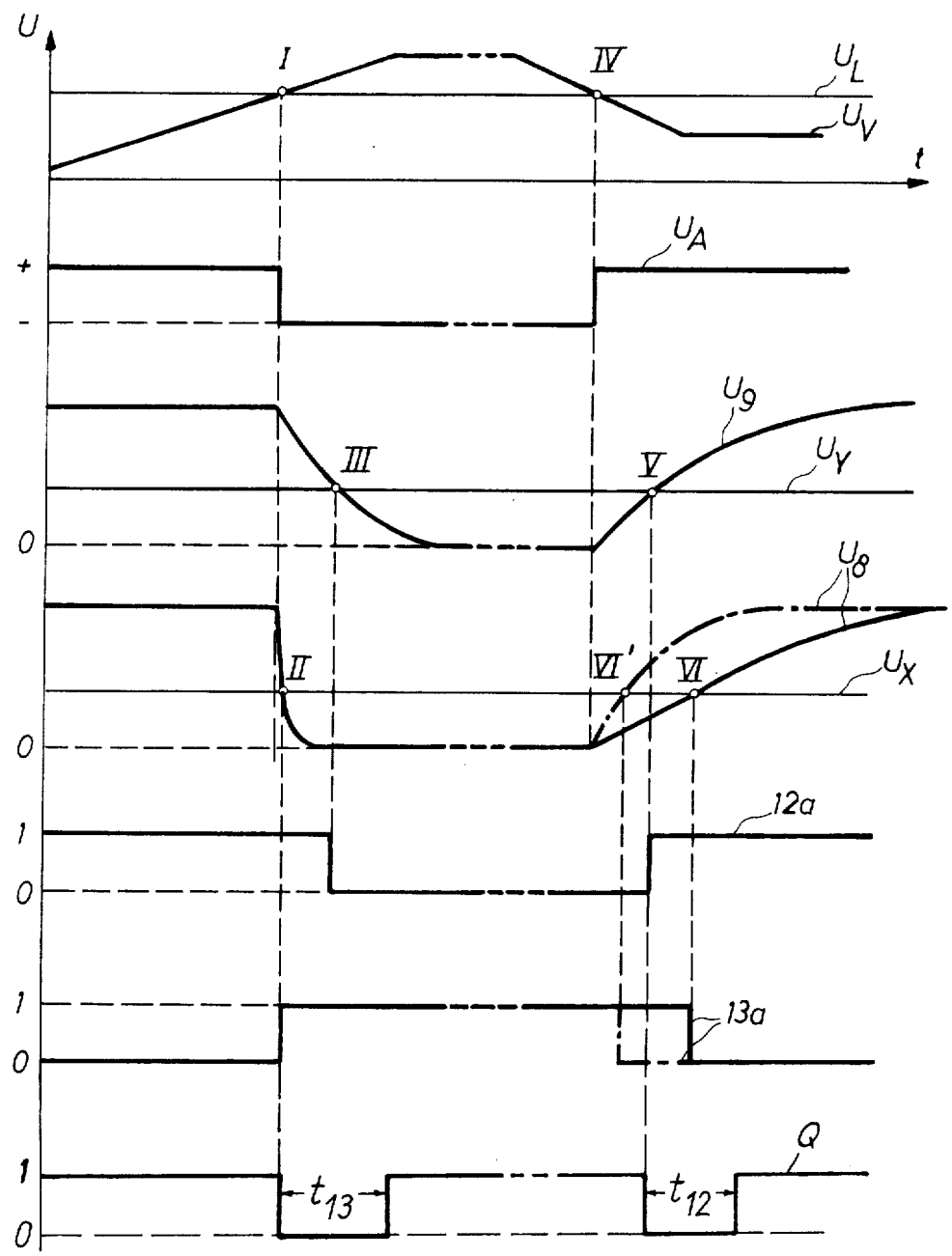
FIG. 4 is a switching diagram illustrating the operation of components of the electronic control arrangement and of the safeguard switching arrangement.

The sequence of events associated with the justdescribed up-shift from second gear to third gear will be described now with respect to FIG. 4. FIG. 4 is comprised of plots versus time t of the RPM-dependent voltage $U_V$ and the voltages $U_8$ and $U_9$ across capacitors 8 and 9. Also plotted is the variation with respect to time of the potential $U_A$ prevailing at output A of stage 25. Curve 12a indicates the energization state of valve solenoid 12, and curve 13a that of valve solenoid 13. The transmission-output-RPM-dependent voltage $U_V$ is at first smaller than the engine-loading-dependent voltage $U_L$, which latter is assumed to be constant in the illustrated example of operation. Accordingly, during the time interval leading to moment I, voltage $U_A$ is positive, voltage $U_9$ greater than voltage $U_Y$, voltage $U_8$ greater than voltage $U_X$, and accordingly valve solenoid 12 is energized and valve solenoid 13 unenergized. If now, because of increasing transmission-output RPM, the voltage $U_V$ at moment I becomes greater than voltage $U_L$, voltage $U_A$ drops to the potential of negative line 22, causing capacitors 8 and 9 to discharge. Because of the different resistances of discharge resistors 33 and 43, capacitor 8 discharges considerably faster than capacitor 9. Voltage $U_8$ falls below voltage $U_X$ at moment II, whereas voltage $U_9$ falls below voltage $U_Y$ not until moment III. Accordingly, between moments II and III the two solenoid valves 12 and 13 are simultaneously energized. In other words, upon the up-shift from second gear to third gear a positive gear-shift overlap action always occurs.

Next, as the transmission-output RPM decreases, voltage $U_V$ falls below voltage $U_L$ again at moment IV, and voltage $U_A$ returns to its original value. As a result, capacitors 8 and 9 become charged up again. Depending upon the resistances of charging resistors 32 and 42, this recharging occurs more or less quickly. In particular, the charging of capacitor 8 proceeds in dependence upon engine loading — i.e., in dependence upon the position of gas pedal 28 and the setting of changeover switch 29, either a. via charging resistor 32a which has a relatively low resistance, or b. via charging resistor 32b which has a relatively high resistance.

In case (a), voltage $U_8$ rises quickly, as indicated by the dash-dot line in FIG. 4. This line rises more steeply than line $U_9$; accordingly, voltage $U_8$ rises above associated voltage $U_X$ at a moment VI' earlier than the moment V at which voltage $U_9$ rises above associated voltage $U_Y$. As a result, solenoid valve 13 is deenergized before solenoid valve 12 is energized. With the gas pedal 28 in the illustrated position (less than half depressed, i.e., low engine loading), there accordingly occurs during the down-shift from third gear into second gear a negative gear-shift overlap action (also referred to as a power-train discontinuity). The duration of the power-train discontinuity is equal to the time interval between moments VI' and V.

In case (b) above, voltage $U_8$ rises relatively slowly, as depicted by the solid line in FIG. 4, and more slowly than does the voltage $U_9$. Voltage $U_8$ rises above associated voltage $U_X$ not until moment VI, i.e., later than the moment V at which voltage $U_9$ rises above associated voltage $U_Y$. Accordingly, solenoid valve 13 is closed after solenoid valve 12 is opened. As a result, when down-shifting at high engine loading there occurs a positive gear-shift overlap action. The duration of the positive gear-shift overlap is equal to the time interval between moments V and VI.

In the electronic control arrangement of FIG. 1, more complex variable resistor arrangements and/or a plurality of variable resistor arrangements can be employed. For example, instead of the two charging resistors 32a, 32b use could be made of a greater number of charging resistors, to provide a more gradual and progressive change in the duration of the gear-shift overlap as a function of changes in the monitored operating parameter. Likewise, use could be made of a potentiometer having a wiper coupled to the gas pedal 28, with the potentiometer being wound in a non-linear manner selected to take into account the speed-torque curve of the engine or motor which drives the transmission. Also, a plurality of variable resistor arrangements could be used so as to take into account more than one variable operating parameter.

Figure 2:
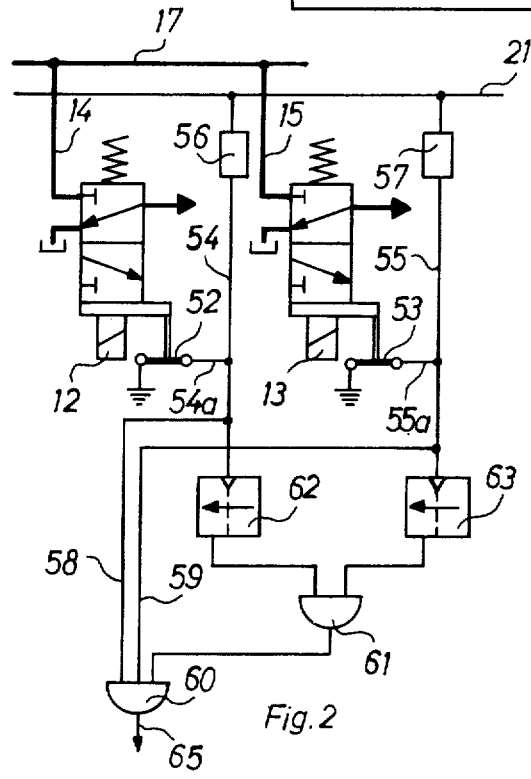
FIG. 2 depicts a safeguard switching arrangement for the solenoid valves of FIG. 1.

FIG. 2 depicts a safeguard switching arrangement operative for preventing excessively long gear-shift overlap times, i.e., unintentional double activation of gear-changing units. The two solenoid valves involved in changeovers from second to third gear, and from third to second gear, are again designated 12 and 13. Each is provided with a respective limit switch 52, 53 which closes when the associated solenoid valve is deenergized.

From a pressure fluid conduit 17, two branch conduits 14, 15 lead through respective ones of the solenoid valves 12, 13 to the associated fluid-actuated frictional gear-changing units (brakes or clutches). Two lines 54, 55 lead from positive battery line 21 via respective resistors 56, 57 to one contact of the respective limit switch 52 or 53; the other contact of each limit switch 52, 53 is connected to ground. Lines 54, 55 are furthermore connected to the inputs of respective monostable multivibrators 62, 63 and, via respective branch lines 58, 59, to the inputs of an AND-gate 60. The outputs of the monostable multivibrators 62, 63 are connected to the inputs of a further AND-gate 61, the output of which is connected to the remaining input of AND-gate 60.

If one makes a certain assumption, discussed below, then there will be generated at output 65 of AND-gate 60 a safeguard switching signal which triggers an interruption in the continuity of the power train of the transmission arrangement by, for example, deenergizing all the solenoid valves used for controlling the flow of pressure fluid to all the gear-changing units (brakes and clutches) of the transmission arrangement. Instead of interrupting the continuity of the transmission power train, the safeguard switching signal at output 65 of AND-gate 60 can trigger a reverse transmission-ratio changeover, i.e., a changeover from the new back to the previous transmission ratio. The aforementioned assumption involves the simultaneous presence of logical 1 signals at all three inputs of AND-gate 60; this occurs when simultaneously 1. solenoid valve 12 is energized and accordingly limit switch 52 is open, 2. solenoid valve 13 is energized and accordingly limit switch 53 is open, and 3. a logical 1 signal is present at the output of each monostable multivibrator 62, 63 and accordingly also at the output of AND-gate 61. This condition prevails so long as no transmission-ratio changeover has been initiated; after the initiation of a transmission ratio changeover, condition (3) occurs upon the elapse of an adjustable time interval $t_{12}$ or $t_{13}$ following the moment at which one of the two solenoid valves 12, 13 is energized (moment II or moment V in FIG. 4).

Upon an up-shift from second gear to third gear, the following occurs: Until moment II only solenoid valve 12 is energized; accordingly line 54, 58 carries voltage (transmits logical 1). Line 55, 59 does not carry voltage (transmits logical 0), because the limit switch 53 is closed. At moment II, the solenoid valve 13 too becomes energized, as a result of which voltage is applied to line 55, 59 and to the input of monostable multivibrator 63. As a result, the voltage at the output of monostable multivibrator 63 and accordingly at the output of AND-gate 61 drops, and rises again after the elapse of the time interval $t_{13}$. However, because the time interval $t_{13}$ which has been selected is greater than the desired gear-shift overlap time interval (the time interval between moments II and III), and assuming proper operation of the switching arrangement, solenoid valve 12 will have been deenergized previously and accordingly the limit switch 52 closed, so that the AND-gate 60 will not generate a safeguard switching signal.

Only in the event of a malfunction (for example a mechanical jamming of the control piston 71 of the solenoid valve 12 such that the control piston does not reach its lower end position and therefore does not cause limit switch 52 to close) do both lines 54, 58 and 55, 59 remain under voltage at the same time as voltage is applied from the output of AND-gate 61 to the input of AND-gate 60; only in this case does the AND-gate 60 generate at its output 65 the aforementioned safeguard switching signal.

Instead of the limit switches 52, 53, use could be made of pressure-responsive switches which could be built into the conduits leading from the solenoid valves to the hydraulically actuated frictional gear-changing units (brakes or clutches). These pressure-responsive switches would simply open in response to the presence of fluid pressure and otherwise be closed.

In FIG. 4, line Q indicates the presence and absence of voltage at the output of AND-gate 61, as a function of time $t$. As can be seen, voltage is always present at such output when no transmission-ratio changeover has been initiated. However, as soon as a new solenoid valve becomes energized, for example at moment II the solenoid valve 13, this causes the voltage at the output of AND-gate 61 to briefly disappear, for a time interval $t_{13}$ selected to be about twice as long as the time interval between moments II and III. Analogously, the same occurs when down-shifting, i.e., when the solenoid valve 12 becomes energized again at moment V. At that moment, the voltage at the output of AND-gate 61 disappears for a time interval $t_{12}$ selected to be approximately twice as long as the time interval intermediate moments V and VI.

Figure 3:
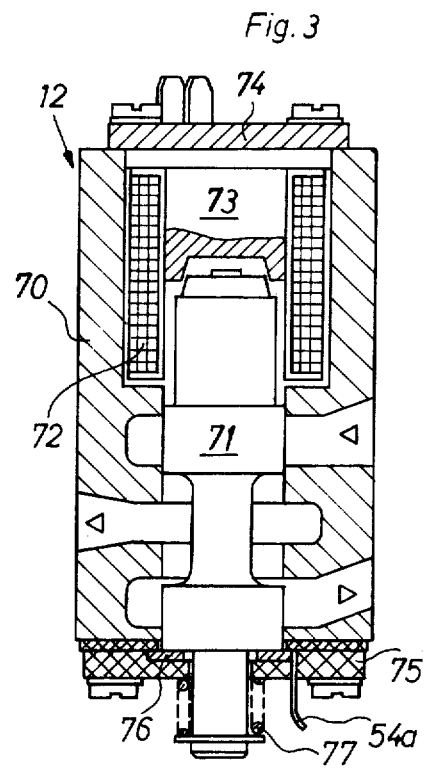
FIG. 3 depicts a solenoid valve with a built-in limit switch.

FIG. 3 depicts structural details of one of the solenoid valves, for example solenoid valve 12. Its principal components are: housing 70, control piston 71 provided with a magnetic armature, solenoid winding 72, and solenoid core 73 with its connector plate 74 shown located at the upper end of the valve. At the opposite (lower) end of the valve there is provided a synthetic plastic cover member 75 into which is inserted an electrically conductive contact ring 76 having a connector lead 54a. When control piston 71 is in the illustrated position, the solenoid valve is closed; the control piston 71 is urged by a compression spring 77 into its illustrated lowermost position in which it abuts against the electrically conductive contact ring 76. When it does so, it forms together with the contact ring a closed limit switch whose second connector lead can be either the compression spring 77 or the housing 70, if the latter are grounded. When control piston 71 is in its upper end position, the limit switch is open. With this design of the limit switch, there is an assurance that the true end position of the control piston will really be detected. This could not be accomplished with the hitherto conventional practice of suitably arranging a conventional discrete limit switch to cooperate with the piston. Also, the disclosed expedient has the advantage that during assembly time is not wasted in precisely mounting and adjusting a discrete limit switch.

It will be understood that each of the elements described above, or two or more together, may also find a useful application in other types of circuits and constructions differing from the types described above.

While the invention has been illustrated and described as embodied in a multiple-transmission-ratio transmission arrangement used in an engine-powered vehicle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a multiple-transmission-ratio transmission arrangement of the type including at least first and second transmission-ratio-establishing units, particularly brakes and/or clutches, having hydraulically activated and unactivated states, the first and second transmission-ratio-establishing units together establishing a first transmission ratio when concurrently the first unit is in a predetermined one of its hydraulic activation states and the second unit is in a predetermined one of its hydraulic activation states, the first and second transmission-ratio-establishing units together establishing a second transmission ratio when concurrently the first unit is in the other of its hydraulic activation states and the second unit is in the other of its hydraulic activation states, an arrangement for changing the transmission ratio of the transmission arrangement in dependence upon variations in at least one monitored operating parameter of the transmission arrangement or of the engine or motor driving the transmission arrangement, comprising, in combination, a source of hydraulic fluid, first and second electrically controllable valve means each leading from monitor signals, respectively, when but only when the associated one of said valve means is in that one of the energization states thereof corresponding to communication of the respective one of said units with said source, and safeguard means operative for receiving said first and second monitor signals and in response to the simultaneous receipt of both a first and a second monitor signal for longer than a preselected time interval operative for effecting deactivation of at least one of said units, wherein said first and second valve means comprise first and second solenoid valves comprised of first and second valve members each being at least in part electrically conductive, and wherein each of said monitoring means comprises a respective monitoring switch whose moving contact is constituted by the electrically conductive part of the valve member of the respective valve.

2. The arrangement defined in claim 1, wherein the one of said first and second time-delay stages whose time-delay interval is automatically adjusted is the time-delay stage associated with the higher-gear transmission ratio.

3. In a multiplpe-transmission-ratio transmission arrangement of the type including at least first and second transmission-ratio-establishing units, particularly brakes and/or clutches, having hydraulically activated and unactivated states and operative when undergoing respective opposite changes of activation state for effecting changeovers between first and second transmission ratios, an arrangement for changing the transmission ratio of the transmission arrangement in dependence upon variations in at least one monitored operating parameter of the transmission arrangement or of the engine or motor driving the transmission arrangement, comprising, in combination, a source of hydraulic fluid, first and second electrically controllable valve means each leading from said source to a respective one of said first and second units and operative when undergoing respective opposite changes of electrical energization state for effecting corresponding opposite changes of activation state of the associated ones of said first and second units; and electronic timing means including first and second time-delay stages electrically connected to respective ones of said valve means and operative in response to the receipt of a signal commanding a transmission-ratio changeover for delaying the initiation of the change of energization state of the respective valve means by respective first and second time-delay intervals, said electronic timing means further including adjusting means for automatically varying the duration of at least one of said time-delay intervals in dependence upon variations in said at least one operating parameter, whereby to cause the initiation of one of the opposite changes of energization involved in a particular transmission-ratio changeover to either lag or lead the initiation of the other change of energization state in dependence upon which of said time-delay intervals is longer, wherein the one of said time-delay stages whose time-delay interval is automatically adjusted comprises a timing capacitor, and means for either charging said timing capacitor through a charging resistor or discharging said timing capacitor through a discharging resistor depending upon whether the command transmission ratio changeover is from the first to the second or from the second to the first of said ratios, and wherein said adjusting means comprises means for automatically adjusting the resistance of that one of said charging and discharging resistors through which capacitor current flows during the changeover from the higher-gear to the lower-gear transmission ratio.

4. In a multiple-transmission-ratio transmission arrangement of the type including at least first and second transmission-ratio-establishing units, particularly brakes and/or clutches, having hydraulically activated and unactivated states and operative when undergoing respective opposite changes of activation state for effecting changeovers between first and second transmission ratios, a source of hydraulic fluid, and first and second electrically controllable valve means each leading from said source to a respective one of said first and second units and operative when undergoing respective opposite changes of electrical energization state for effecting corresponding opposite changes of activation state of the associated ones of said first and second units, an arrangement for preventing simultaneous activation of said first second units for excessive periods of time, comprising, in combination, first and second monitoring means each coupled to respective ones of said first and second valve means and each operative for generating first and second monitor signals, respectively, when but only when the associated one of said valve means is in that one of the energization states thereof corresponding to communication of the respective one of said units with said source, and safeguard means operative for receiving said first and second monitor signals and in response to the simultaneous receipt of both a first and a second monitor signal for longer than a preselected time interval operative for effecting deactivation of at least one of said units, wherein said safeguard means comprises means operative in response to the simultaneous receipt of both a first and a second monitor signal for longer than a preselected time interval during a changeover from one to the other of said ratios for effecting deactivation of at least one of said units by initiating a reverse changeover from said other to said one of said ratios.

5. In a multilple-transmission-ratio transmission arrangement of the type including at least first and second transmission-ratio-establishing units, particularly brakes and/or clutches, having hydraulically activated and unactivated states and operative when undergoing respective opposite changes of activation state for effecting changeovers between first and second transmission ratios, a source of hydraulic fluid, and first and second electrically controllable valve means each leading from said source to a respective one of said first and second units and operative when undergoing respective opposite changes of electrical energization state for effecting corresponding opposite changes of activation state of the associated ones of said first and second units, an arrangement for preventing simultaneous activation of said first second units for excessive periods of time, comprising, in combination, first and second monitoring means each coupled to respective ones of said first and second valve means and each operative for generating first and second monitor signals, respectively, when but only when the associated one of said valve means is in that one of the energization states thereof corresponding to communication of the respective one of said units with said source, and safeguard means operative for receiving said first and second monitor signals and in response to the simultaneous receipt of both a first and a second monitor signal for longer than a preselected time interval operative for effecting deactivation of at least one of said units, wherein said safeguard means comprises first and second monostable multivibrators having inputs respectively connected to receive said first and second monitor signals and respective first and second outputs connected to inputs of one AND-gate, and another AND-gate having one input connected to the output of said one AND-gate and having two further inputs connected to respectively receive said first and second monitor signals and operative for generating at the output of said other AND-gate a safeguard switching signal for triggering deactivation of at least one of said units.

6. In a multiple-transmission-ratio transmission arrangement of the type including at least first and second transmission-ratio-establishing units, particularly brakes and/or clutches, having hydraulically activated and unactivated states and operative when undergoing respective opposite changes of activation state for effecting changeovers between first and second transmission ratios, a source of hydraulic fluid, and first and second electrically controllable valve means each leading from said source to a respective one of said first and second units and operative when undergoing respective opposite changes of electrical energization state for effecting corresponding opposite changes of activation state of the associated ones of said first and second units, an arrangement for preventing simultaneous activation of said first and second units for excessive periods of time, comprising, in combination, first and second monitoring means each coupled to respective ones of said first and second valve means and each operative for generating first and second said source to a respective one of said first and second units said first and second electrically controllable valve means each having a first electrical energization state and a second electrical energization state, said first electrically controllable valve means being operative when in one of its electrical energization states for causing the first transmission-ratio-establishing unit to assume one of its hydraulic activation states, said second electrically controllable valve means being operative when in one of its electrical energization states for causing the second transmission-ratio-establishing unit to assume one of its hydraulic activation states and being operative when in the other of its electrical energization states for causing the second transmission-ratio-establishing unit to assume the other of its hydraulic activation states; and electronic timing means including first and second time-delay circuit stages electrically connected to respective ones of said valve means and each operative in response to the receipt of a signal commanding a transmission-ratio changeover for delaying the initiation of the change of electrical energization state of the respective valve means by respective first and second time-delay intervals, said electronic timing means further including adjusting means for automatically varying the duration of at least one of said time-delay intervals in dependence upon variations in said at least one operating parameter, whereby to cause the initiation of one of the opposite changes of electrical energization state state involved in a particularly tranmission-ratio changeover to either lag or lead the initiation of the other change of electrical energization state in dependence upon which of said time-delay intervals is longer.

* * * * *